(12) United States Patent
Bascom

(10) Patent No.: US 11,743,358 B1
(45) Date of Patent: Aug. 29, 2023

(54) FEDERATION BROKER SYSTEM AND METHOD FOR COORDINATING DISCOVERY, INTEROPERABILITY, CONNECTIONS AND CORRESPONDENCE AMONG NETWORKED RESOURCES

(71) Applicant: Thomas Layne Bascom, McLean, VA (US)

(72) Inventor: Thomas Layne Bascom, McLean, VA (US)

( * ) Notice: Subject to any disclaimer, the term of this patent is extended or adjusted under 35 U.S.C. 154(b) by 0 days.

(21) Appl. No.: 17/971,447

(22) Filed: Oct. 21, 2022

Related U.S. Application Data

(60) Continuation of application No. 17/502,799, filed on Oct. 15, 2021, now Pat. No. 11,483,413, which is a division of application No. 16/893,408, filed on Jun. 4, 2020, now Pat. No. 11,153,400.

(60) Provisional application No. 62/921,191, filed on Jun. 4, 2019.

(51) Int. Cl.
    *H04L 67/562*     (2022.01)
    *H04L 67/10*     (2022.01)

(52) U.S. Cl.
    CPC ............ *H04L 67/562* (2022.05); *H04L 67/10* (2013.01)

(58) Field of Classification Search
    CPC .............................. H04L 67/562; H04L 67/10
    See application file for complete search history.

(56) References Cited

U.S. PATENT DOCUMENTS

| | | |
|---|---|---|
| 5,095,480 A | 3/1992 | Fenner |
| 5,369,761 A | 11/1994 | Conley et al. |
| 5,701,484 A | 12/1997 | Artsy |
| 6,167,444 A | 12/2000 | Boden |

(Continued)

OTHER PUBLICATIONS

Bascom, T. L., LinkSpace the Semantic Internet Company, Jul. 19, 2013, McLean, VA.

(Continued)

*Primary Examiner* — Austin J Moreau
(74) *Attorney, Agent, or Firm* — Aldo Noto; Davidson Berquist Jackson & Gowdey LLP

(57) ABSTRACT

A computerized broker system for enabling coordination of computerized federation resources in a networked computer environment to support discovery, connection and correspondence with the computerized federation resources, the computerized broker system disclosed. The computerized broker system enables the coordination of unique meaningful multipart identifiers and resolver outcomes that satisfy the mutual interest of federation members and ensure agreement, interoperability, usability, reusability, flexibility, stability, expected behaviors, scalability, avoidance of conflict, and other such mutual benefits that are difficult to achieve at scale through member to member cooperation and with no brokerage. A method for distributing and discovering networked resources in a computerized broker system is disclosed and a further method for managing federated networks and federation resources in a computerized broker system is also disclosed. The methods of the present invention enable the creation of one or more federations of independent individuals who share a mutual interest in distributing federated resources, wherein the independent individuals organize to pursue the mutual benefit of distributing networked resources.

20 Claims, 6 Drawing Sheets

(56) References Cited

U.S. PATENT DOCUMENTS

| | | | |
|---|---|---|---|
| 6,850,528 | B1 | 2/2005 | Crocker et al. |
| 6,865,567 | B1 | 3/2005 | Oommen et al. |
| 6,871,321 | B2 | 3/2005 | Wakayama |
| 6,957,224 | B1 | 10/2005 | Megiddo |
| 6,971,096 | B1 | 11/2005 | Ankireddipally |
| 7,003,562 | B2 | 2/2006 | Mayer |
| 7,111,232 | B1 | 9/2006 | Bascom |
| 7,139,974 | B1 | 11/2006 | Bascom |
| 7,158,971 | B1 | 1/2007 | Bascom |
| 7,162,485 | B2 | 1/2007 | Gottlob et al. |
| 7,200,563 | B1 | 4/2007 | Hammitt et al. |
| 7,240,325 | B2 | 7/2007 | Keller |
| 7,389,241 | B1 | 1/2008 | Bascom |
| 7,386,792 | B1 | 6/2008 | Bascom |
| 7,388,865 | B2 | 6/2008 | Parent et al. |
| 7,567,915 | B2 | 7/2009 | Hammitt et al. |
| 7,627,580 | B2 | 12/2009 | Fujii |
| 7,702,521 | B2 | 4/2010 | Bascom |
| 7,716,189 | B1 | 5/2010 | Panchbudhe et al. |
| 7,756,873 | B2 | 7/2010 | Gould et al. |
| 7,797,340 | B2 | 9/2010 | Cheng et al. |
| 7,798,417 | B2 | 9/2010 | Snyder et al. |
| 7,853,680 | B2 | 12/2010 | Phatak |
| 7,870,188 | B2 | 1/2011 | Mazzitelli |
| 7,953,875 | B2 | 5/2011 | Bonsma |
| 7,984,128 | B2 | 7/2011 | Vambenepe |
| 8,201,180 | B2 | 6/2012 | Briscoe et al. |
| 8,260,825 | B2 | 9/2012 | Cras et al. |
| 8,335,981 | B2 | 12/2012 | Naibo et al. |
| 8,515,998 | B1 | 8/2013 | Bascom |
| 8,655,757 | B1 | 2/2014 | Wookey |
| 8,676,944 | B2 | 3/2014 | Meleis |
| 8,874,613 | B2 | 10/2014 | Gorelik et al. |
| 8,935,277 | B2 | 1/2015 | Kuchmann-Beauger et al. |
| 8,938,808 | B1 | 1/2015 | Spertus et al. |
| 9,038,062 | B2 | 5/2015 | Fitzgerald et al. |
| 9,043,352 | B1 | 5/2015 | Bascom |
| 9,047,386 | B2 | 6/2015 | Bascom |
| 9,087,215 | B2 | 7/2015 | LaFever et al. |
| 9,087,216 | B2 | 7/2015 | LaFever et al. |
| 9,098,958 | B2 | 8/2015 | Joyce |
| 9,106,515 | B2 | 8/2015 | Chou et al. |
| 9,128,934 | B2 | 9/2015 | Bascom |
| 9,129,093 | B2 | 9/2015 | Rothschild et al. |
| 9,129,133 | B2 | 9/2015 | LaFever et al. |
| 9,171,079 | B2 | 10/2015 | Banka |
| 9,183,120 | B1 | 11/2015 | Webb |
| 9,218,431 | B2 | 12/2015 | Bascom |
| 9,336,253 | B2 | 5/2016 | Gorelik et al. |
| 9,361,481 | B2 | 6/2016 | LaFever et al. |
| 9,619,669 | B2 | 4/2017 | LaFever et al. |
| 10,043,035 | B2 | 8/2018 | LaFever et al. |
| 10,572,684 | B2 | 2/2020 | LaFever et al. |
| 2016/0014140 | A1* | 1/2016 | Akireddy ............... H04L 63/20 726/1 |
| 2017/0091397 | A1* | 3/2017 | Shah ..................... H04L 63/20 |
| 2020/0388359 | A1* | 12/2020 | Bhandari .............. H04L 67/306 |

OTHER PUBLICATIONS

Bascom, T.L., Opportunity Exploration Corporation for National Research Initiatives—LinkSpace, Apr. 6, 2015.

Bascom, T.L., The Entity-Instance-Relationship Model, May 23, 2007, 2007 Semantic Technology Conference, san Jose, CA.

Bailis et al., Scalable Atomic Visibility With Ramp Transactions, SIGMOD'14, Jun. 22-27, 2014, Snowbird, UT, available at Scalable Atomic Visibility With RAMP . . . (bailis.org).

Bailis et al., Eventual Consistency Today: Limitations, extensions, and Beyond, 2013 UC Berkeley available at p20-bailis.pdf (berkeley.edu).

Woods et al., Enterprise-class API Patterns for Cloud & Mobile, May 2012, CITO Research.

Hickey, R., The Value of Values, Aug. 14, 2012, International Software Development Conference, Copenhagen, available at Keynote: The Value of Values (infoq.com).

Gassert, C., D12E Globally Unique Identifier (GUI) Specification, pp. 78-81, Nov. 23, 2015, Plugfest Industry Day, Department of Defense.

Firat et al., Contextual Alignment of Ontologies for Semantic Interoperability (WITS/ICIS) Jan. 2005, Paper 215, MIT Sloan School of Management, Center for eBusiness@MIT.

Firat et al, Multi-dimensional Ontology Views via Contexts in the ECOIN Semantic Interoperability Framework, 2005, American Association for Artificial Intelligence.

Mockapetris, P., Domain Names—Implementation and Specification, Request for Comments 1035, Nov. 1987, Internet Engineering Task Force, Wilmington DE.

Berners-Lee et al., Uniform Resource Identifiers (URI): Generic Syntax, Aug. 1998, Request for Comments 2396, Internet Engineering Task Force, Wilmington, DE.

Daigle, L., Domain-Based Application Service Location . . . Discovery Service (DDDS) Jan. 2005, Request for Comments 3958, Internet Engineering Task Force, Wilmington, DE.

Mealling, M., Dynamic Delegation Discovery System (DDDS) Part One: The . . . , Oct. 2002, Request for Comments 3401, Internet Engineering Task Force, Wilmington DE.

Nottingham, M., Well-Known Uniform Resource Identifiers (URIs), May 2019, Request for Comments 8615, Internet Engineering Task Force, Wilmington, DE.

Nottingham, M., URI Design and Ownership, Jul. 2014, Request for Comments 7320, Internet Engineering Task Force, Wilmington, DE.

Popp et al., Common Name Resolution Protocol (CNRP), Aug. 2002, Request for Comments 3367, Internet Engineering Task Force, Wilmington, DE.

Mealling et al., An IETF URN Sub-namespace for Registered Protocol Parameters, Jun. 2003, Request for Comments 3553, Internet Engineering Task Force, Wilmington DE.

W3C, Indexed Database API, Jan. 8, 2015, Worldwide Web Consortium, Cambridge, MA, availabled at https://www.w3.org/TR/2015,REC-indexedDB-20150108.

Object Management Group, OMG Data Distribution Service (DDS), Apr. 2015, Object Management Group, Needham, MA, available at https://www.omg.org/spec/DDS/1.4/PDF.

Oasis, UDDI Verson 3.0.2, Oct. 19, 2014, Oasis, available at http://www.uddi.org/pubs/uddi v.3htm UDDI Version 3.0.2.

Object Management Group, Architecture-Driven Modernization: Knowledge Discovery Meta-Model (KDM), Sep. 2016, Object Management Group,m Needham, MA.

Object Management Group, Common Object Request Broken Architecture (CORBA) Specification Version 3.1.1, http://www.omg.org/spec/CORBA/3.1.1/Interoperability/PDF, Aug. 2011.

Object Management Group, Naming Service Specification, Version 1.3 Oct. 2004.

Naming Service Specification, Revised Edition Feb. 2001.

* cited by examiner

FEDERATION BROKER SYSTEM AND METHOD FOR COORDINATING DISCOVERY, INTEROPERABILITY, CONNECTIONS AND CORRESPONDENCE AMONG NETWORKED RESOURCES

CROSS REFERENCES TO RELATED APPLICATIONS

This application claims the benefit of Applicants' prior provisional application, No. 62/921,191, A COMPOSITE RESOLVER FEDERATION BROKER FOR COORDINATING DISCOVERY, INTEROPERABILITY, CONNECTIONS AND CORRESPONDENCE AMONG NETWORKED RESOURCES, filed on Jun. 4, 2019, which is incorporated herein by reference in its entirety.

FIELD OF INVENTION

The technology relates to the general field of documents and other resources stored on interconnected computer networks, and has certain specific application to the maintenance, organization, discovery, connection with and access to such stored network resources.

BACKGROUND

A multitude of differing resources may connect to networks in order to correspond with other resources and share information. Many of these connections and correspondences are in the form of one or more resolving processes. Typically, it is advantageous for network connected resources to be readily discoverable and to be broadly interoperable to support meaningful correspondence with as many other relevant connected resources as possible. Modern networks support a multitude of modes and forms of connections and correspondence. For example, connections may be made, and correspondence may be conveyed, in any number of modes such as synchronous or asynchronous, stateful or stateless, connected or connectionless, packet switched or circuit switched, wired or wireless, point to point, multicast or broadcast, digital or analog, etc. Connections and correspondence may be in many forms such as data, voice, images, video, signals, messages, communications, queries, alerts, etc. Those familiar with the art will recognize that there a multitude of existing and possible modes and forms of connections and correspondence among resources connected to networks.

The Internet is a shared network, supporting a variety of connections and correspondence needs, among a variety of connected resources, which may connect and correspond. Connecting a resource to the Internet, with its shared architecture which was designed to openly support connections and correspondence around the world, gives that connected resource the ability to connect and correspond with an incomprehensible number of other resources on a global scale. However, the Internet's open ability to make connections and enable correspondence on a global scale was not designed to support the discovery of valid connections. A connected resource's ability to be discovered by, and to discover, other connected resource which are suitable to connect and correspond with, is dependent on intermediary services on the network which suggest connections, or on integrated applications and services which are configured with connections.

To reduce the chaos that is caused by the availability of multiple competitive, independently developed, and thus incompatible resources, and to reduce the effort required for independently developed resources to connect and correspond with one another to satisfy the variety of needs, businesses often cooperatively develop standards when it is mutually beneficial to coordinate resource interoperability which may support discovery connection, and correspondence. The number of cooperating parties can be few or many. The cooperating parties may be unknown to each other—associated only through their mutual adoption of the cooperatively developed standard. The cooperatively developed standard may be developed and used by only 2 parties that wish to ensure their resources are interoperable. Some standards may not be cooperatively developed at all but reflect an industry leader's approach. Standards may not be documented, but their benefits implemented through cooperative development and test efforts. Examples of cooperatively developed standards are those developed by the telecommunications industry, which establish requirements governing the functions of resources such as telecommunications equipment. These cooperatively developed standards memorialize the mutual agreements among the participants. Each of the participants then develop their components and telecommunications equipment contributions according to their interpretation of the standard. Those coordinated telecommunication equipment standards ensure that components and telecommunications equipment contributions from a variety of contributors are a.) interoperable, meaning contributions by different members of the community can perform the coordinated interactions with one another with dependable results; and b.) interchangeable, meaning that contributions by different members, if made to perform like functions, can be substituted with one another and produce the same dependable results.

A great number and variety of cooperatively developed standards have been developed. Also, as technology advances, new resources, compliant with new cooperatively developed standards are replacing outdated versions and those outdated, resources, though still valuable, are becoming unavailable or inaccessible if the interoperability with new resources compliant with new technology standards is not supported.

Furthermore, many of the connection and correspondence needs satisfied in the network connected world rely on complex orchestration of a variety and number of resources provided by a multitude of independent contributors, developed according to independent interpretations of a multitude of cooperatively developed standards. For example, there are now seemingly endless competitive combinations of independently developed complex-orchestrations of resources that enable us to correspond with providers of video entertainment resources. E.g. one can use their cable network connection, via their cable box connected by RCA jacks to an older tube-type television, to watch a movie as it is being broadcast, or to watch it at their convenience if it is available for streaming from a video distributor through a cable provider. Alternately, one can use their mobile device, connected through a cellular or Wi-Fi network to stream the same movie from a number of video streaming services. One could also watch the movie as, it is broadcast via the new Digital Television broadcast network if they have upgraded their analog television network antenna and receiver to be compatible. In yet another complex orchestration of resources, one could record a cable network broadcast, of the movie on their VCR or DVR and watch the recording on a large HDMI compatible video display. Given a need to watch a movie, the user's options are limited by these choices. Unfortunately, despite the abundance of choices, a user's ability to discover and view the movie they wish is limited by the complex-orchestrations of resources such as devices, applications, licenses, service subscriptions, and network connections they have, at the time and place they wish to view it.

The above movie example describes the complex options available to satisfy a simple, and popular need to view a single commodity resource that is generally available from a number of contributors. The challenge is much greater when a user's need is to gather and merge information from a multitude of contributions both known and unknown to the user. An example of this scenario is the need by participants in the global supply chain to assemble actionable information about consumer behavior and sentiments or about the pedigree and flow of products and materials throughout global networks of sellers and suppliers. In this example, the inputs are contained in a multitude of information systems such as those supporting raw material supplier and certification records management, manufacturing operations management, enterprise resource planning, inventory management, transportation and distribution management, billing and fulfillment management, and regulatory and tariff compliance management. Developing solutions to coordinate the discovery, connections and correspondence required to gather and merge information from across this global landscape of independent contributors. and their variety of devices, information, services and connections to satisfy just one information need is a daunting task—even if the developer of the solution were able to get every participant to cooperate. The thing in common among this heterogeneity is the network that provides connections.

The ability to satisfy connection and correspondence needs ad hoc, or as needs demand, in the current network connected world, given these complexities, is typically satisfied by specialized solution integrators who cobble together device, information, service and connection resources and ensure those combinations satisfy the need. The choices made in cobbling these contributions together can exclude other contributions. The exclusion can be intentional—based on, for example, financial considerations or on technical considerations such as the need to exclude obsolete contributions or to select one contribution from several mutually exclusive alternates. The exclusions can be unintentional—based on limited awareness of the availability of other contributions or the inability to anticipate obsolescence or future options. This inefficiency and inability to satisfy such needs ad hoc is counterintuitive, given the premise that contributors to the solution have connected their resources to communications networks to connect and communicate with other resources, and that contributors want the resources that they connect to be readily discoverable and to broadly interoperable. Those familiar with the art will recognize that the current network's inability to spontaneously support discovery and interoperability for connections and correspondence among resources as needed is a barrier to satisfying needs.

Federations and Federation Brokers.

Federations are formed when autonomous members recognize a need to cooperate with others to simplify undertakings that would be harder without cooperation. Members of a federation have a mutual interest, in cooperating to ensure agreement, interoperability, usability, reusability, flexibility, stability, expected behaviors. scalability, avoidance of conflict, and other such mutual benefits that are difficult to achieve at scale through member to member cooperation.

In ideal federations, cooperation is openly coordinated among willing members and a minimum of constraint is used to ensure that the coordinated terms of the federation do not usurp the rights of the members of the federation nor prevent innovation in the undertakings of the members. In ideal federations, members conform with terms of the federation and other members may assume they comply with coordinated terms.

The internet community cooperates on many federations used to enable discovery, connection, and correspondence among network connected resources. The Internet community uses principles of openness and extensibility when coordinating standards to achieve ideal federations. For example, the technical standards of the Internet Engineering Task Force (IETF) for Uniform Resource Identifiers (URIs) discourages independent standards that mandate particular font's of URI substructure because that essentially usurps ownership. The IETF also discourages coordinating URI substructures to avoid interoperability challenges where coordinated URI substructures are not used consistently by URI owners or are assumed to be used when they are not.

Many of these ideal federations coordinate identifiers and resolver outcomes that are composed of various organizations of multiple parts. The control of parts may be centrally managed by ideal federation managers or delegated widely and loosely governed. The parts may include factors, substructures that include factors, and structures that include substructures and factors. The parts may represent values that uniquely identify resources and rules that support interpretation and use. The coordination of parts may be delegated to other federations. The parts may be organized and interpreted in hierarchically or organized but interpreted independently.

One of the internet protocols that complies with the IETF's URI technology standards is the hypertext transfer protocol (HTTP). The HTTP is one of many possible multipart URI federations coordinated through the IETF. The HTTP is a subset of URN used to identify internee connected resources that is used as a Uniform Resource Locator (URL) wherein the URL provides access information. One HTTP federation member, using HTTP enabled systems and methods can use an HTTP URI compliant multipart resource identifier to discover, connect and correspond with the identified resource. While HTTP URLs have access information needed by network enabled devices to support discovery, connection and correspondence with a resource, HTTP URLs do not contain coordinated information that reflects the nature of the identified resource that allows the URL to be discovered. Nor do URLs have coordinated information useful for selection of a resource identified by the URL once the URL is discovered.

The internet community also uses principles of openness and extensibility when managing the allocations of standards-based identifiers to resources in ideal federations of resource identifiers. For example, the allocation of domain names in the Domain Name System (DNS) on the Internet is managed openly with few constraints beyond the lowest levels of the hierarchical substructure. The Internet root domain is coordinated with and shared by everyone. The first name level of the DNS substructure, Top-Level Domains (TLDs), some are called generic gTLDs, are managed by accredited registry operators under agreements with Internet Corporation for Assigned Names and Numbers (ICANN). Registry operators maintain the registry and domain names, the second level of the DNS substructure, with restraints contained in IETF standards and ICANN agreements. The coordination and allocation of subdomain names, the third level substructure of the DNS and beyond, has been delegated to domain name owners to manage and allocate as they wish. Thus, open cooperative agreement on use of the great majority of DNS substructures, which with coordination would allow highly descriptive graph descriptions of the named resources, ends at the domain level. In addition, for fairness, sovereign domain names have traditionally been allocated on a first-come first-served basis. These constraints on coordination and lack of independent coordination of the use of DNS have made domain names arbitrary identifiers.

Ironically, the ideals that constrain the IETF standards and ICANN's administration of allocated names and numbers have ensured naming chaos. Without coordination, every URI is essentially allocated arbitrarily to resources, with opaque naming logic that makes the URI unknowable by anyone besides the owner.

The ideals that constraint the coordination and allocation of resource identifiers is an impediment for federation members that wish to cooperate to better use resource identifiers to enable distribution and selection of resources by coordinating resource, identifiers that support discovery, connection and correspondence. This failure to cooperate is a wasteful inefficient use of a shared resource, that is central to the economy. The Internet does not act as a marketplace because the resources on the internet are arbitrarily named. If networked resources were given identities that reflected a coordinated description of their nature, the internet may begin to behave as an efficient market where resources could be discovered by their coordinated identity.

The ideals that constrain the coordination and allocation of resource identifiers is an impediment to network security and management because the federated resource identifiers do not reflect meaningful coordinated descriptions of the resources they identify. Thus, network activities involving the resource identifier and the identified resource may not be associated with their nature or appropriate use. Likewise, arbitrary resource identifiers provide the systems that manage and secure networks little information useful for security and management. There is a need for resource identifiers and network activities involving resource identifiers to be meaningfully coordinated to provide better security and network management.

Resource names that are arbitrarily assigned are unknowable. There is a need for coordinating, among federations, the creation and allocation of meaningful multipart resource identifiers that, can be used for distribution and selection of network connected resources. There is a need for discovering resources by coordinating, among federations, the re-creation of allocated meaningful multipart resource identifiers that are suitable for selection, discovery, connection and correspondence with identified resources and information about identified resources.

There is a need for systems and methods that coordinate the assignment of meaningful, coordinated, multipart resource identifiers to enable distribution and selection of resources by coordinating resource identifiers that support discovery, connection and correspondence.

There is a need for a broker to coordinate among many independent members of many independent federations to help those who have resources to distribute those resources to other members who are seeking resources. The coordination by the broker allows the many independent members who seek resources to quickly identify the resources they seek from the many independent members who have resources when the number, variety and independence of the federation member resources are too many to consider.

There is a need for a broker to ensure that resource identifiers used are unique, allocated, reflect the nature of the resource suitable for selection and can be used to discover, connect and correspond with the identified resource.

There is a need for brokers to coordinate unique meaningful multipart identifiers and resolver outcomes that satisfy the mutual interest of federation members and ensure agreement, interoperability, usability, reusability, flexibility, stability, expected behaviors, scalability, avoidance of conflict, and other such mutual benefits that are difficult to achieve at scale through member to member cooperation and with no brokerage.

There is a need for brokers to ensure multipart identifiers used for resource distribution and selection describe the resource they identify.

There is a need to coordinate among multipart identifier federations to allow unique identification of resources across multipart name federations.

There is a need to coordinate multipart name federations that allow resources to be uniquely identified using coordinated parts.

There is a need to coordinate multipart name federations that allow unique identifiers for resources to support locating the named resource and information about the named resource on networks.

SUMMARY

The present invention discloses a computerized broker system for enabling coordination of computerized federation resources in a networked computer environment to support discovery, connection and correspondence with the computerized federation resources. The computerized broker system includes: a plurality of computerized federations each including one or more memory devices; the plurality of computerized federations themselves including: a first federation, the first federation including first members, the first members include a common interest grouping of one or more of networked computer systems, network routing and switching systems, networked database applications, networked information server systems, and other related networked memory devices and applications; a second federation, the second federation including second members, the second members include a common interest grouping of one or more of networked computer systems, network routing and switching systems, networked database applications, networked information server systems, and other related networked memory devices and applications; and one or more off-network federations, the one or more off-network federations including off-network members, the off-network members include a common interest grouping of one or more of computer systems, network routing and switching systems, database applications, information server systems, and other related memory devices and applications; one or more federation communications networks; one or more federation user networked computing devices; and one or more computerized federation brokers each including one or more memory devices. In the computerized broker system of the present invention, the first federation also includes one or more computers and memory devices wherein the following are stored: one or more management functions, one or more term records, one or more resolver records, the resolver records comprising resolver outcomes, one or more membership records, one or more identifiers records, one or more activity records, and one or more delegated federations. In the computerized broker system of the present invention, the one or more federation brokers is configured to coordinate among the one or more federation users, the one or more federation communications networks, and the plurality of federations, to reach agreements on independent interpretations and implementations of the plurality of federations; and wherein the agreements on independent interpretations and implementations of the plurality of federations are stored as the term records, management functions, resolver records, membership records, identifier records, and activity records of the first federation, in order to improve agreement and interoperability among the one or more of the plurality of federation users, the one or more federated communication networks, and the plurality of federations.

The present invention further discloses a method for distributing and discovering networked resources in a computerized broker system. This method includes steps for: creating a federation of independent individuals who share a mutual interest in distributing federated networked resources; creating and configuring a distribution federation; enabling independent individuals to join the distribution federation; enabling a first user to select a second user for distribution; the first user selecting information about the selected second user; the first user selecting a multipart identifier federation to coordinate the creation, distribution, and resolving of a multipart identifier; the first user coordinating with a configured broker to choose a type of multipart federation identifier that is permitted by terms of the selected federation; the first user coordinating with the configured broker to make selections of parts to create a multipart federation identifier; verifying the created multipart federation identifier as a unique multipart federation identifier; the first user and the configured broker coordinating allocation of the created multipart federation identifier to identified one or more federation resources and to the second user by creating resolver records, and recording activity; a third user joining the distribution federation and joining the computerized broker system; the third user selecting a first part in coordination with the computerized broker system; the computerized broker system coordinates with the third user in searching the distribution federation for instances of the selected part; the computerized broker system presenting results to the third user from member federations comprising one or more of identifiers, additional parts, coordinated resolver records and terms, the third user selecting from the presented results; the third user selecting desired identifiers, adding required information to incomplete parts of incomplete identifiers to form completed identifiers, and using the completed identifiers to discover, connect and correspond with independent federation resources; and the computerized broker system coordinating recording activity.

The present invention also discloses a further method for managing federated networks and federation resources in a computerized broker system, the method including steps for: creating a network and resource management federation of networked computer resources in the computerized broker system; coordinating the network and resource management federation with one or more additional federations of networked computer resources in the computerized broker system; adding and configuring one or managed members; adding a configuring one or more managing members; and managing the federated networks and the federation resources.

BRIEF DESCRIPTION OF THE DRAWINGS

Various embodiments of the invention are disclosed in the following detailed description and accompanying drawings.

DETAILED DESCRIPTION OF THE DRAWINGS AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

A. Federation—are organizations or groupings that are formed when autonomous members recognize a need to cooperate with others to simplify undertakings that would be harder without cooperation.

B. Federation user—is something or someone that uses federations to coordinate interoperability among members including interoperability of identifiers; networked federation users may use federations to discover, connect and correspond with one another; federation users may create, exchange, and operate on requests, records and outcomes.

C. Independent authoritative federation—is a subset of federation members who maintain an independent interpretation and implementation of the federation.

D. Identifier—Uniquely identifies a member resource in a federation.

E. Multipart identifier—is an identifier comprising two or more parts.

F. Broker—coordinates the use of identifiers, multipart identifiers and multipart identifier parts among federations and independent authoritative federations.

G. Resolver—resolves information about an identifier and about a resolver's response to resolving an identifier.

Figure 1:
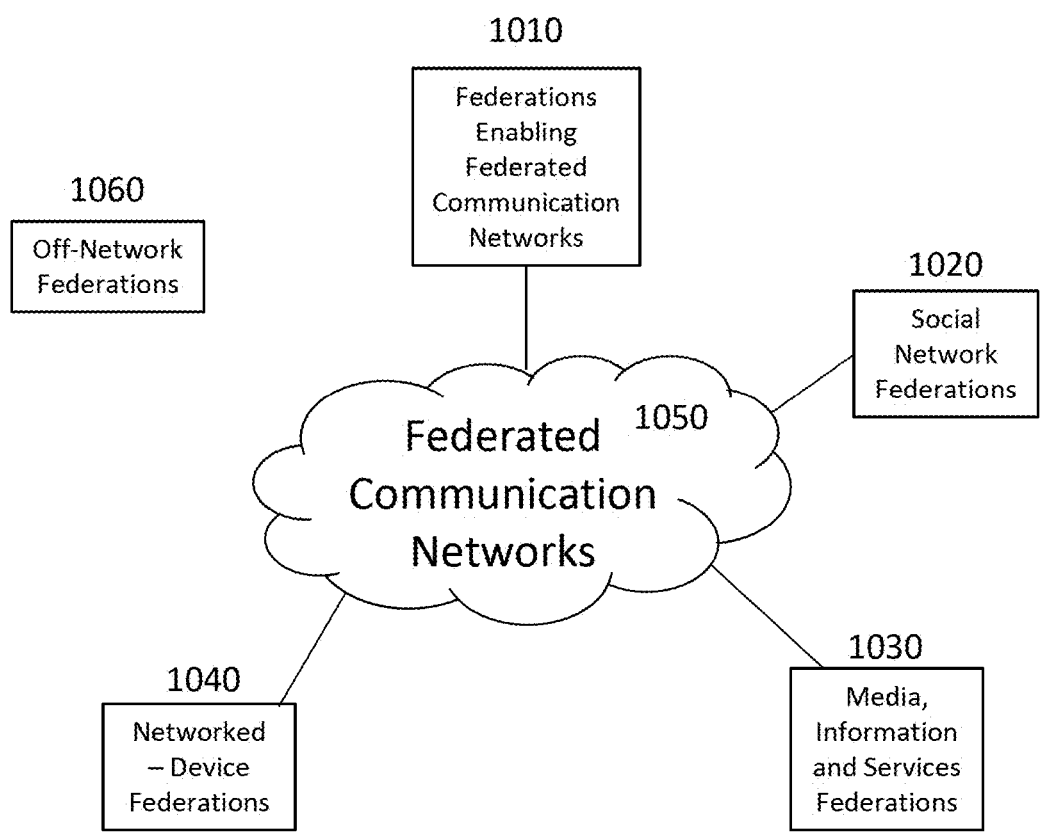
FIG. 1 illustrates one embodiment of a networked environment including a plurality of federations that would benefit from the broker systems and methods of the present invention.

FIG. 1 illustrates one embodiment of a networked computer environment including several of the many possible types of federations that would benefit from the broker systems and methods of the present invention. Federations are formed when autonomous members recognize a need to cooperate with others to simplify undertakings that would be harder without cooperation. Members of a federation may include a common interest grouping of one or more of networked computer systems, network routing and switching systems, networked database applications, networked information server systems, and other related devices and applications. Members of a federation have a mutual interest in cooperating to ensure agreement, interoperability, usability, reusability, flexibility, stability, expected behaviors, scalability, avoidance of conflict, while ensuring fairness, competition, choice, creativity, innovation, and other such mutual benefits that are difficult to achieve at scale through member to member cooperation.

FIG. 1 presents several types of federations. In FIG. 1 the federations enabling federated communications networks 1010 are formed by stakeholders in the telecommunications industry. An example of federations enabling federated, communications networks 1010 may include new applications for federations of quantum entangled resources. Their coordination ensures that the global telecommunications networks are stable, resilient and competitive despite the heterogeneity of federated communication networks 1050. In FIG. 1 the social network federations 1020 are formed by stakeholders to coordinate such things as business, personal, and commercial information, activities and connections. In FIG. 1 the media, information and services federations 1030 are formed by stakeholders to manage and distribute media, information, and service resources. In FIG. 1 the networked—device federations 1040 are formed by stakeholders to coordinate such things as open device connectivity across a variety of networks, common functions, and autonomous operations. Many federations in FIG. 1 are present on federated communication networks 1050. In FIG. 1 the off-network federations 1060 are formed for such things as labeling, addressing homes and businesses, and generally classifying types of tangible and intangible items and distinguishing one from another. The off-network federations 1060 are often used by federation types 1010, 1020, 1030, and 1040 that are on, federated communication networks 1050.

Figure 2:
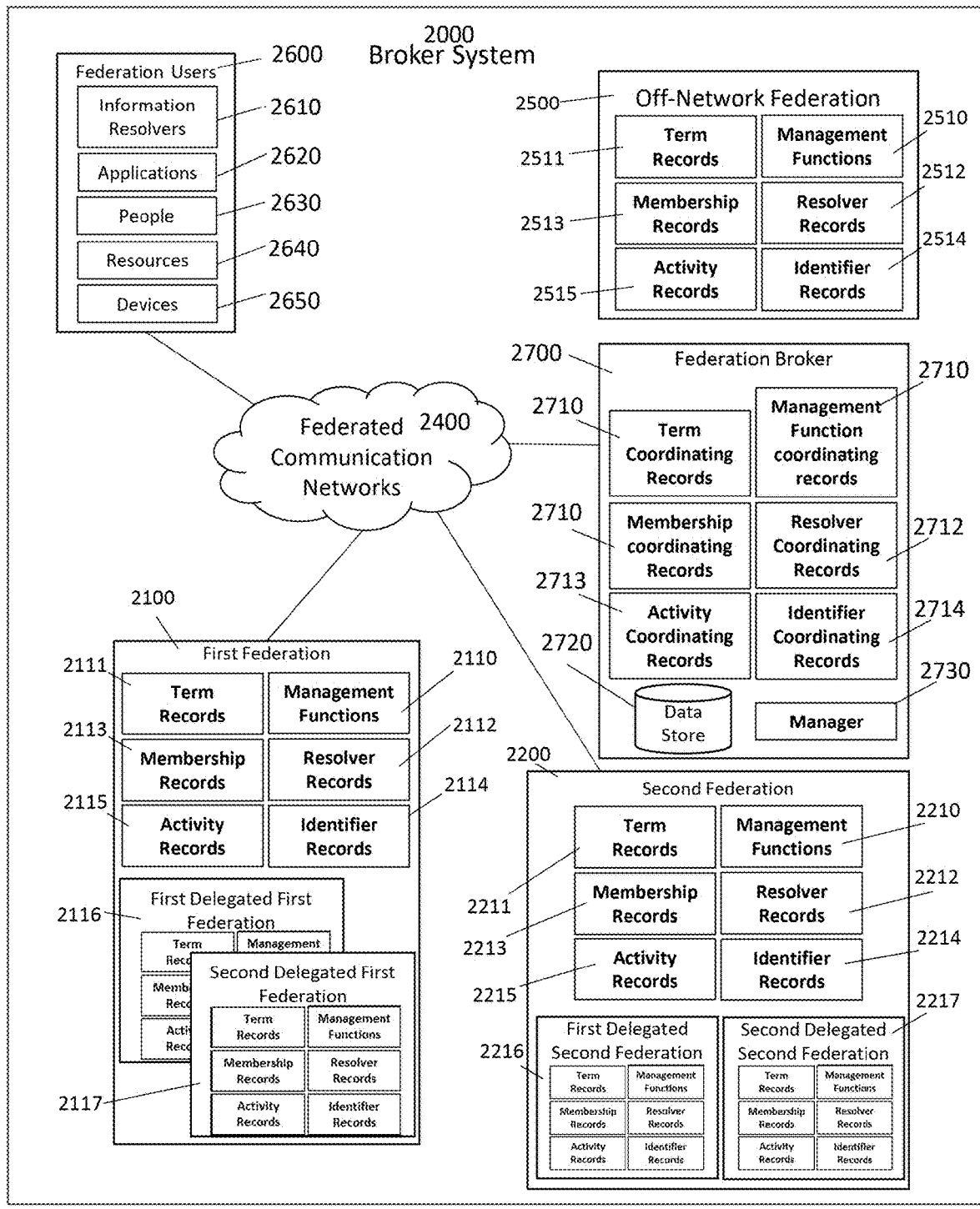
FIG. 2 illustrates an embodiment of a computerized broker system of the present invention operating in, a networked environment.

FIG. 2 illustrates a preferred embodiment of a computerized broker system 2000 described by the current invention operating in a networked computer environment. FIG. 2 shows the computerized broker system 2000 comprising a plurality of federations, including first federation 2100, second federation 2200, and off-network federation 2500. As is common in a networked computer environment, each federation 2100, 2200, and 2500 includes one or more memory devices for executing the functions and managing the information within the federations 2100, 2200, 2500. The computerized broker system 2000 also includes federated communications networks 2400, federation user networked computing devices 2600, and one or more computerized federation brokers 2700 each including one or more memory devices.

First federation 2100 includes members wherein the members comprise a common interest grouping of one or more of networked computer systems, network routing and switching systems, networked database applications, networked information server systems, and other related networked memory devices and applications. The first federation 2100 includes one or more computers and memory devices wherein the following are stored: one or more management functions 2110, term records 2111, resolver records 2112, membership records 2113, identifier records 2114 and activity records 2115. First federation 2100 also includes one or more delegated federations, including by way of example first delegated first federation 2116 and second delegated first federation 2117.

Similarly, second federation 2200 includes members wherein the members comprise a common interest grouping of one or more of networked computer systems, network routing and switching systems, networked database applications, networked information server systems, and other related networked memory devices and applications. The second federation 2200 includes one or more computers and memory devices wherein the following are stored: one or more management functions 2210, term records 2211, resolver records 2212, membership records 2213, identifier records 2214 and activity records 2215. Second federation 2200 also includes one or more delegated federations, including by way of example first delegated second federation 2216 and second delegated second federation 2217.

The one or more term records 2111 of the first federation 2100 represent agreements among members of the plurality of federations wherein these agreements assure the mutual benefits and behaviors of the first federation 2100. The first and second delegated first federations 2116 and 2117 are enabled to comply with term records 2111 but are independent implementations and interpretations of the first federation 2100. The first and second delegated first federations 2116 and 2117 further comprise independent interpretations and implementations of term records, management functions, resolver records, membership records and identifier records corresponding in kind to the one or more management functions 2110, term records 2111, resolver records 2112, membership records 2113, identifier records 2114 and activity records 2115 of first federation 2100.

Similarly, the one or more term records 2211 of the second federation 2200 represent agreements among members of the plurality of federations wherein these agreements assure the mutual benefits and behaviors of the second federation 2200. The first and second delegated second federations 2216 and 2217 are enabled to comply with term records 2211 but are independent implementations and interpretations of the second federation 2200. The first and second delegated second federations 2216 and 2217 further comprise independent, interpretations and implementations of term records, management functions, resolver records, membership records and identifier records corresponding in kind to the one or more management functions 2210, term records 2211, resolver records 2212, membership records 2213, identifier records 2214 and activity records 2215 of second federation 2200.

Membership records 2113 of the first federation 2100 store data records including information required to identify members of the system, their roles and permissions, and delegation records.

Identifier records 2114 of the first federation 2100 store one or more identifiers allocated in first federation 2100 in data records (not shown). These identifiers may comprise one or more parts and the one or more parts may include factors, substructures that include factors, and structures that include substructures and factors. The parts of the identifier records 2114 may represent values that uniquely identify resources and rules that support interpretation and use.

Resolver records 2112 of the first federation 2100 store one or more data records that support resolving operations of the first federation 2100. Resolver records 2112 allow an identifier to be resolved to outcomes (not shown). These outcomes (not shown) may comprise one or more parts and the one or more parts may include factors, substructures that include factors, and structures that include substructures and factors. The parts of the outcomes may represent values that uniquely identify resources and rules that support interpretation and use.

Management functions 2110 of the first federation 2100 store data records used to manage the term records 2111, resolver records 2112, membership records 2113, identifier records 2114, activity records 2115, and the first and second delegated first federations 2116 and 2117 of first federation 2100 to ensure that the first federation 2100 operates and remains stable, compliant and coordinated.

In FIG. 2, first federation 2100 and second federation 2200 are configured to delegate authority to a multitude of delegated federations including first delegated first federation 2116, second delegated first federation 2117, first delegated second federation 2216, and second delegated second federation 2217. The federations 2100, 2200, and 2500, as they are arranged in the current embodiment can be configured to delegate authority in a multitude of ways.

In FIG. 2, first federation 2100, second federation 2200, off network, federation 2500, first delegated first federation 2116, second delegated first federation 2117, first delegated second federation 2216, and second delegated second federation 2217 may be authoritative federations. The term records 2111, 2211, 2511; the management functions 2110, 2210, 2510; resolver records 2112, 2212, 2512; membership records 2113, 2213, 2513; identifier records 2114, 2214, 2514; and activity records 2115, 2215, 2515 may therefore contain authoritative records that represent the one true record, which may be immutable and may be referenced for benefits such as coordination of implementations and interpretations and avoidance of ambiguity.

In one representative example of the preferred embodiment, second federation 2200 can be configured to manage a multitude of formats for multipart identifiers. In this example of the preferred embodiment, the first and, second delegated second federations 2216 and 2217 may be configured to manage independent interpretations and implementations of the multitude of formats for multipart identifiers for the second federation 2200. Such configurations of the preferred embodiment are advantageous where authority over the format of a multipart identifier is centralized to ensure interoperability across the federation, but details of implementation are delegated peerwise, such as for URLs.

In another representative example, second federation 2200 may be configured to manage hierarchical delegation to the first and second delegated second federations 2216 and 2217, and the first and second delegated second federations 2216 and 2217 may each be further configured to delegate authority to a multitude of other delegated, federations (not shown). Such configuration of the current arrangement of the second federation 2200 and the first and second delegated second federations 2216 and 2217 for hierarchical delegation are advantageous where authority is delegated hierarchically as in, the DNS and IP federations' delegation of authority for hierarchical, sequentially resolved network names and numbers.

The broker system 2000 of FIG. 2 may also include one or more off-network federations 2500 which include management functions 2510, term records 2511, resolver records 2512, membership records 2513, identifier records 2514, and activity records 2515 that are similar to those similarly named items in the first federation 2100 and second federation 2200, but configured for the purposes of the one or more off-network federations 2500. The identifier records 2514 of the one or more off-network federations 2500 may comprise one or more parts.

In yet another representative example, off-network federation 2500 may be configured for brokering, though it is, not a network-connected federation, Such off-network federations may benefit from the brokers' coordination with online federations that frequently create proxy identifiers for members of offline federations once an off-network federation identifier is resolved.

For example, drivers' licenses and Radio Frequency Identifier (RFID) enabled badges (not shown) may be members of one or more off-network federation and configured with off network federation identifiers (not shown) that may be resolved when presented to a scanning device that is a member of the offline federation. In the current example, the holder of a driver's license and an RFID enabled badge may present them to scanning devices that are members of the off-network federation and one or more federations configured for brokering which in turn create proxy identifiers for the holder. In this example, the broker system 2000 may be configured to coordinate among one or more driver's license and RFID badge off-network federations configured for brokering (not shown) and the one or more federations configured for brokering which have created a variety of proxy identifiers for the holder (not shown) after resolving the example identifiers of the delegated off-network federations.

The broker system 2000 also includes a plurality of federation users 2600. The federation users 2600 may be members of and use the first and second federations 2100 and 2200, off-network federations 2500, and the one or more federation brokers 2700 to coordinate agreement and interoperability among other of the federation users 2600. The federation users 2600 include one or more of information resolvers 2610, applications 2620, people 2630, resources 2640 and devices 2650 that may be members of and configured to use one or more of the first and second federations 2100 and 2200, off-network federations 2500, and the one or more federation brokers 2700.

In one representative example of the preferred embodiment, a configured federation user 2600 of a configured broker system 2000 may comprise a cellular phone (not shown) which is a networked computing device that further comprises a multitude of configured federation users 2600 of the configured broker system 2000 that are members of a multitude of federations 2100, 2200, off-network federations 2500 and delegated federations 2116, 2117, 2216 and 2217.

The cellular phone of the example includes devices 2650 that are users and members of one or more federated network communication protocols (not shown), such as network interface cards (not shown), that support connection of the network interface cards with other users and members of the federated communications network protocols: GPS receivers (not shown) that are members and users of GPS federations; and subscriber identification module (SIM) cards (not shown) that are users and members of one or more SIM card protocol federations which are in turn members of one or more federated cellular networks (not shown). The SIM card contains an identifier that may be stored in information resolvers 2610, devices 2650 and other federation users 2600 and resolved by other federation users 2600 to support network operations and collect and manage activity.

The network interface cards are encoded with a media access control address (MAC) that uniquely identify them to the other members and users. When the network interface cards connect the cellular phone to federated communication networks 2400, such as federated cellular networks, federated wifi networks and federated bluetooth networks (not shown), other members and users of the federated cellular, wifi and bluetooth, networks may allocate other federation identifiers to the network interface card and SIM card and create resolver records resolver records 2112, 2212, 2512 associating the network interface cards, MAC identifiers and SIM identifiers with the allocated identifiers. These resolver records 2112, 2212, 2512 enable network operations. The resolver records resolver records 2112, 2212, 2512 may be coordinated by the broker system 2000 in resolver coordinating records 2712.

The other members and users of the federated cellular, wifi and bluetooth networks may create activity records 2115, 2215, 2515 representing activities associated with the MAC identifiers, SIM identifiers and their allocated identifiers. The other members and users of the federated cellular, will and Bluetooth networks may also create membership records 2113, 2213, 2513 and identifier records 2114, 2214, 2514 associated with the MAC identifiers, SIM identifiers and their allocated identifiers. Such activity records, membership records and identifier records and resolver records may be coordinated by the broker system 2000 in one or more resolver coordinating records 2712, membership coordinating records 2713, identifier coordinating records 2714, and activity coordinating records 2715. Such coordination enables discovery and, access to the resolver records, the activity records, the membership records, and the identifier records that are distributed, and also enables discovery and access among a multitude of federation users 2600 of a multitude of federations 2100, 2200, off-network federations 2500 and federated communications networks 2400. The discovery and access of the current example enabled by the broker system 2000 is preferred over the present state of the art where the resolver records the activity records, the membership records, and the identifier records that are relevant to the cellular phone of the current example, and these records are created within so many federations and by so many independent users that a satisfactory discovery process may require accessing and searching every member of every federation and accumulating and associating relevant records. Such discovery methods are enabled by machine learning, which requires a great deal of network activity, computations and access to all members of all federations to accomplish results similar to those of the present example. The present invention may improve the efficiency of such machine learning by improving the discovery of relevant information for a task involving elements of the broker system 2000.

The cellular phone of the above example may further include a multitude of applications, resources, and devices that are members of yet other federations. For example, the phone may have a camera device 2650, and applications 2620, that are members and users of federations in a previous example that enable the cellular phone to act as a scanner of off-network federation members and users for other federations and federation users that need off-network federation identifiers. The cellular phone of the current example may further include a DNS server which is an authoritative delegated member of a multipart hierarchical domain and allows federation users 2600 of the phone to be given unique domain identifiers in multipart hierarchical domains that allow the identified federation users 2600 to be identified on federated communication networks 2600. More specifically, the phone may host a federated web service that is allocated a name in a meaningful multifactor domain that is discoverable with the broker system 2000 of FIG. 2.

As has been shown in FIG. 2, the plurality of federations, including first federation 2100, second federation 2200, and off-network federation 2500, comprise a variety of arrangements and configurations of federations requiring coordination to configure them for brokering.

The broker system 2000 also comprises one or more federation brokers 2700. The one or more federation brokers 2700 provide coordination among one or more of the plurality of federation users 2600, the one or more federated communication networks 2400, and the plurality of federations, including first federation 2100, second federation 2200, and off-network federation 2500. Such coordination brokered by the one or more federation brokers 2700 includes coordinating agreement on the multitude of independent interpretations and implementations of the plurality of federations, including first federation 2100, second federation 2200, and off-network federation 2500. The coordinated agreements may be stored as the term records 2111, 2211, 2511; the management functions 2110, 2210, 2510; resolver records 2112, 2212, 2512; membership records 2113, 2213, 2513; identifier records 2114, 2214, 2514; and activity records 2115, 2215, 2515, of the associated plurality of federations 2100, 2200, and 2500, in order to improve agreement and interoperability among the one or more of the plurality of federation users 2600, the one or more federated communication networks 2400, and the plurality of federations 2100, 2200, and 2500.

The one or more federation brokers 2700 further comprise management function coordinating records 2710, term coordinating records 2711, resolver coordinating records 2712, membership coordinating records 2713, identifier coordinating records 2714, activity coordinating records 2715, one or more networked computer data stores 2720, and one or more networked managers 2730 running on one or more networked computer systems. The broker system 2000 enables the federation users 2600, the one or more federated communication networks 2400, and the plurality of federations, including first federation 2100, second federation 2200, and off-network federation 2500, to create coordinating records 2710, 2711, 2712, 2713, 2714, and 2715, in the one or more federation brokers 2700 in order to coordinate unique and meaningful terms, users, activities, identifiers, multipart identifiers, resolver outcomes and parts among the multitude of independent interpretations and implementations such that the multitude of independent interpretations and implementations of terms, users, activities, identifiers, multipart identifiers, resolver outcomes and parts can be created, discovered, understood, selected, compared and used.

The coordinating records 2710, 2711, 2712, 2713, 2714, and 2715 of the preferred embodiment comprise independent interpretations and implementations of term records, management functions, resolver records, membership records and identifier records corresponding in kind to the one or more management functions 2110, term records 2111, resolver records 2112, membership records 2113, identifier records 2114 and activity records of first federation 2100. The coordinating records 2710, 2711, 2712, 2713, 2714, and 2715 of an embodiment may comprise coordinating information. The coordinating records 2710, 2711, 2712, 2713, 2714, and 2715 of the embodiment further contain records representing the term records 2111, 2211, 2511; the management functions 2110, 2210, 2510; resolver records 2112, 2212, 2512; membership records 2113, 2213, 2513; identifier records 2114, 2214, 2514; and activity records 2115, 2215, 2515, of the associated plurality of federations 2100, 2200, and 2500, and the coordinating information. An example of a system used for creating, searching and resolving the coordinating records 2710, 2711, 2712, 2713, 2714, and 2715, can be seen in the description of U.S. Pat. No. 7,386,792, issued on. Jun. 10, 2008, hereby incorporated by reference in its entirety.

The networked computer data store 2720 stores the coordinating records 2710, 2711, 2712, 2713, 2714, and 2715; the term records 2111, 2211, 2511; the management functions 2110, 2210, 2510; resolver records 2112, 2212, 2512; membership records 2113, 2213, 2513; identifier records 2114, 2214, 2514; and activity records 2115, 2215, 2515 in data structures for federation users 2600 of the broker system 2000. In alternate embodiments, the federations 2100, 2200 and may prefer to store the term records 2111, 2211, 2511; the management functions 2110, 2210, 2510; resolver records 2112, 2212, 2512; membership records 2113, 2213, 2513; identifier records 2114, 2214, 2514, and activity records 2115, 2215, 2515 in another data store of their choosing. The data structures will normalize data of the coordinating records 2710, 2711, 2712, 2713, 2714, and 2715.

The networked manager 2730 enables the brokering activities and administration of the federation broker 2700.

The broker system 2000 of FIG. 2 further includes one or more federated communication networks 2400 operating to connect by means of established networking protocols the first federation 2100, second federation 2200, federation users 2600, and federation brokers 2700.

The first federation 2100, the second federation 2200, and the federation users 2600 may be configured to enable the federated communication networks 2400, as in FIG. 1. The term records 2111, 2211, 2511; the management functions 2110, 2210, 2510; resolver records 2112, 2212, 2512; membership records 2113, 2213, 2513; identifier records 2114, 2214, 2514; and activity records 2115, 2215, 2515, of the associated plurality of federations 2100, 2200. and 2500, which may be made accessible as a plurality of first federation 2100, second federation 2200, and federation users 2600 are configured for brokering and the federation brokers 2700 management function coordinating records 2710, term coordinating records 2711, resolver coordinating records 2712, membership coordinating records 2713, identifier coordinating records 2714, and activity coordinating records 2715 can provide a wealth of activity useful for network security and management.

In alternate embodiments (not shown), elements of the broker system 2000 may be configured with blockchain or other record systems that maintain immutable records. In yet other embodiments of the invention, the broker system 2000 may be configured to coordinate changes to authoritative identifier records 2114, 2214, 2514 and 2515 that are parts of other identifier records 2114, 2214, 2514 and 2515.

In alternate embodiments (not shown) the broker system may enable alternatives to the Open System Interconnect stack by allocating highly descriptive and unique resource identifiers that may be built into the connection layer of federated communications networks 2400 network and relieve the application layer of discovery, selection connection and correspondence functions.

Figure 3:
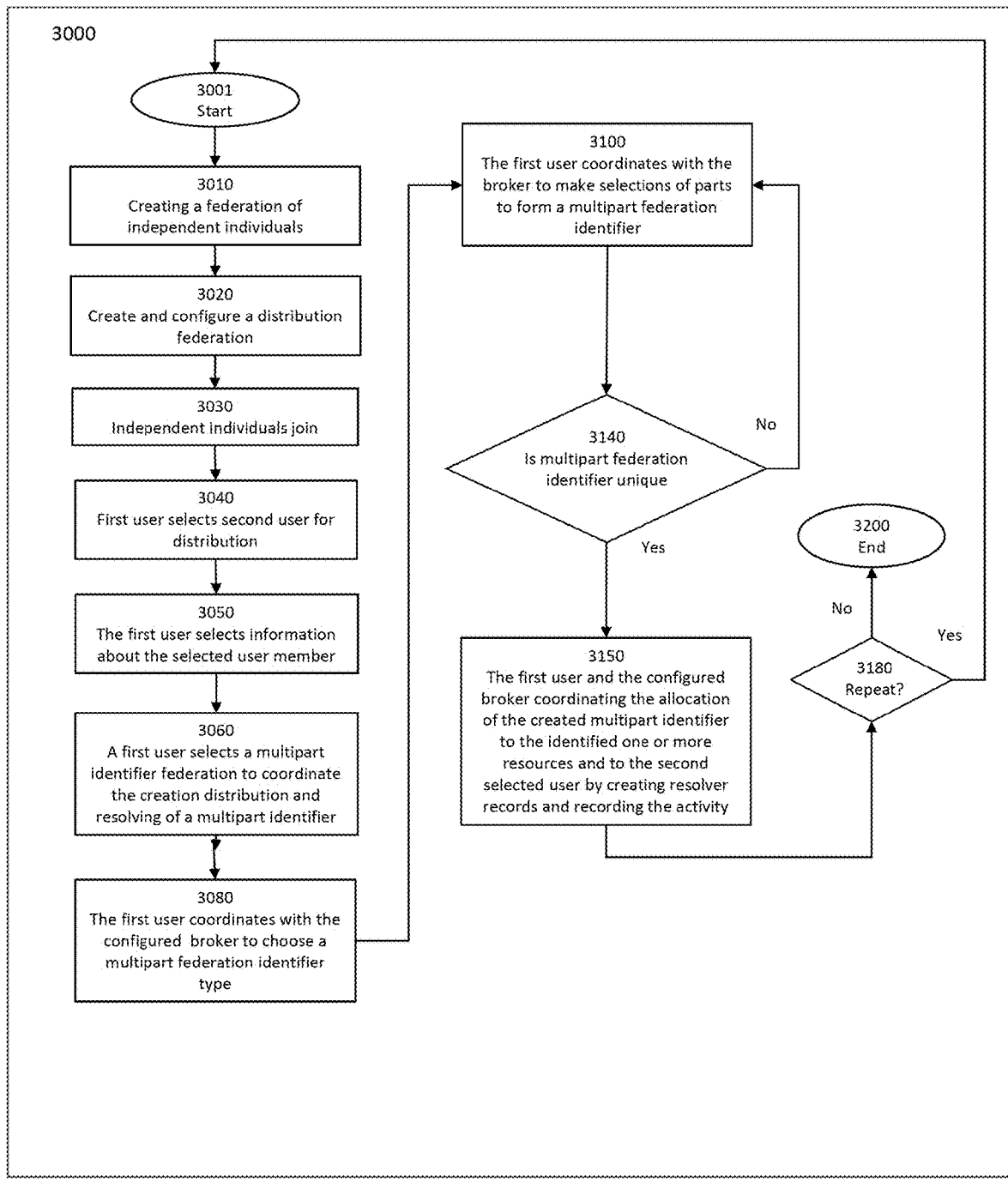
FIG. 3 illustrates a method for distributing networked resources in a computerized broker system.

FIG. 3 illustrates a method for distributing networked resources in a computerized broker system. FIG. 3 is a flowchart showing the steps of a method 3000 for distributing networked resources according to the present invention.

Arbitrary identifiers limit the distribution choices for networked resources. The arbitrariness of resource identifiers makes them unsuitable for discovery and selection and there is no coordination of structure or content that reflects the nature of the identified resource that might allow identifiers to be meaningfully indexed or inferred by a potential user of the identified resource. Attempts to distribute networked resources by publishing metadata through open systems such as Resource Description Framework (RDF) or commercial systems such as ad words can be frustrating when metadata content and format are loosely coordinated and not expressive enough to differentiate networked resources in these RDF and ad word distribution channels. The method of the current invention enabled by the coordinating functions of the present broker system 2000 enables distribution of networked resources by assigning coordinated identifiers suitable for distribution and meaningful selection, and by coordinating the use of the distributed identifier to resolve information about the identified resource that will support selection of the resource, discovery of the resource on the network, and connection and correspondence with the resource.

The method operates within the broker system 2000 above wherein the broker system 2000 includes various devices such as computer memory devices, routers, network switches, communication links, communication software, routing software, computing devices, and sensors, to enable the method 3000 on the broker system 2000.

The federation users 2600 include one or more of information resolvers 2610, applications 2620, people 2630, resources 2640 and devices 2650. These federation users 2600 are the networked resources that would benefit from the current invention. Today, these federation users 2600 are arbitrarily named and difficult to discover because they lack suitable distribution channels. One example federation of the current invention is a hotel reservation federation (not shown). Popular hotel booking applications dominate the market because they have made possible point to point integrations with the hotel booking systems of thousands of hotel brands that resolve booking quotes for presentation to travelers in the popular hotel booking applications.

A traveler can enter their travel plan once in the popular hotel booking app and gather quotes brokered by the popular hotel booking app. The current example allows a competitor to provide an app to travelers that will deliver a similar experience without the same investments in integration. In a possible embodiment of the current invention, all of those hotels integrated with the popular hotel booking app might create and join a federation of hotel booking applications, coordinate meaningful identifiers that may be distributed to federation of hotel booking federation users 2600 of the application 2620 type using the current method. The hotels can coordinate a unique identifier for their booking quote resolver which may be considered a federation user 2600 of the resolver type 2610 that they have to integrate only once with their booking quote resolver, but this identifier is discoverable and useable by all applications 2620 using the methods of FIG. 4 to discover and present travel booking options from the members of the federation of hotel booking applications. Rather than a competitor application 2620 integrating with thousands of independent travel booking sites, they can join the federation of hotel booking applications, configure their application 2620 and perform the methods of FIG. 4 and deliver results similar to the highly integrated, expensive and rigid popular travel apps. The federation of hotel booking applications may coordinate with other federations of the example broker system 2000 such as with DNS federations to coordinate domain name parts within their distributed multipart identifiers.

The method 3000 for distributing and discovering networked resources using a broker system 2000 includes a series of steps performed within the broker system 2000 using the one or more memory devices of the computerized broker system 2000.

In the current invention the method 3000 comprises a first step 3010 of creating a federation of independent individuals who share a mutual interest in distributing federated resources, wherein the independent individuals organize to pursue the mutual benefit of distributing networked resources.

The method 3000 continues with step 3020 for creating and configuring a distribution federation, the step comprising configuring one or more independent federations in the current invention for distribution. The creating a distribution federation step includes having an affiliated group of users 2600 creating, and configuring a broker system 2000 with a distribution federation having the features and functions consistent with federations 2100, 2200 of FIG. 2. The creating a distribution federation step 3020 further comprises configuring the created distribution federation for managing members and managed members by creating one or more of the term records 2111, 2211, 2511; the management functions 2110, 2210, 2510; the resolver records 2112, 2212, 2512; the membership records 2113, 2213, 2513; the identifier records 2114, 2214, 2514; and the activity records 2115, 2215, 2515 that reflect the terms, management functions, resolver records, membership records identifier records and activity records necessary for distribution activities of the independent federations of affiliated individuals creating the federation.

The step 3020 further includes the distribution federation members selecting one or more of the plurality of federations 2100, 2200, off-network federations 2500 and delegated federations 2116, 2117, 2216, that will be useful to the distribution federation members when performing the further steps of the current method. The step 3020 further comprises coordinating one or more of the configured term records 2111, 2211, 2511; the management functions 2110, 2210, 2510; the resolver records 2112, 2212, 2512; the membership records 2113, 2213, 2513; the identifier records 2114, 2214, 2514 of the distribution federation with the term records 2111, 2211, 2511; the management functions 2110, 2210, 2510; the resolver records 2112, 2212, 2512; the membership records 2113, 2213, 2513; the identifier records 2114, 2214, 2514 of the selected one or more of the plurality of federations 2100, 2200, off-network federations 2500 and delegated federations 2116, 2117, 2216; wherein the coordinating agreements are stored as management function coordinating records 2710, term coordinating records 2711, resolver coordinating records 2712, membership coordinating records 2713, identifier coordinating records 2714, and activity coordinating records 2715 of the federation broker 2700.

The joining step 3030 comprises having the one or more of the individuals in the independent federations of affiliated individuals become users 2600 of the configured broker, system 2000 and members of the created distribution federation and selected one or more of the plurality of federations.

The selecting for distribution step 3040 includes having a first member select a second member of the created distribution federation for distribution. As an example, the first member may be a federation user 2600 who is one of a people 2630 who wishes to distribute resources and the second member may be a federation user 2600 that is a resource 2640 or, alternately an information resolver 2610.

The selecting information step 3050 enables the first member to select information about the second member for distribution and selection. The selecting of information includes identifying one or more resources 2640 that comprise information that further describes the selected second member and may be useful for presentation to assist with the selection of the second member in the methods of FIG. 4.

Figure 4:
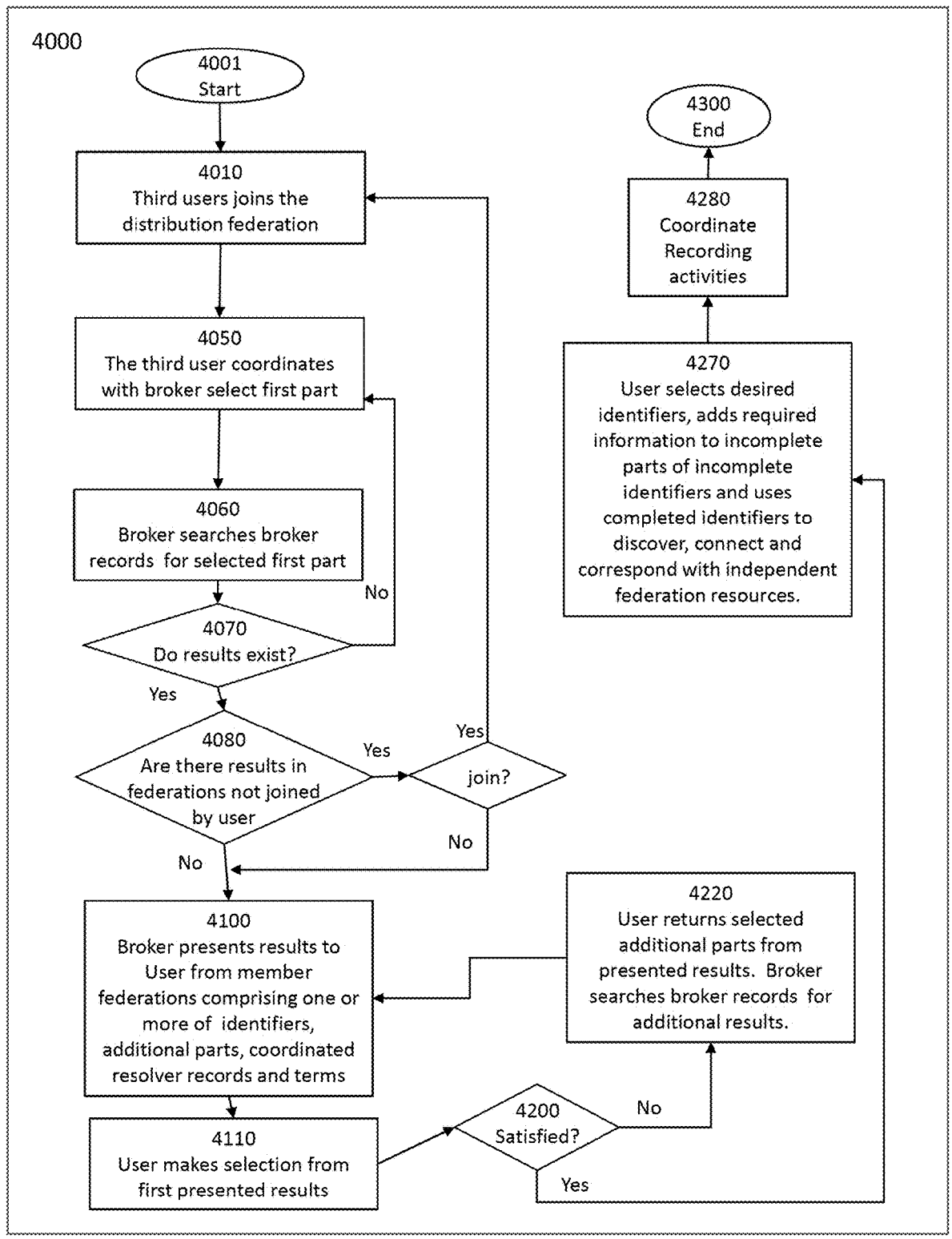
FIG. 4 illustrates a method for discovering networked resources in a computerized broker system.

The multipart identifier federation selection step 3060 enables the first member to coordinate with the configured broker system 2000 to select a federation to coordinate the creation, distribution and resolving of a multipart identifier; the selecting a federation comprising selecting a federation from the one or more of the plurality of federations wherein the configured tenet records 2111, 2211, 2511; management functions 2110, 2210, 2510; resolver records 2112, 2212, 2512; membership records 2113, 2213, 2513; identifier records 2114, 2214, 2514 and coordinating agreements management functions coordinating records 2710, term coordinating records 2711, resolver coordinating records 2712, membership coordinating records 2713, identifier coordinating records 2714, and activity coordinating records 2715 of the federation broker 2700 of the selected federation support the creation, of a unique identifier suitable for distribution with the methods of FIG. 4.

The multipart identifier format selection step 3080 enables the first user to coordinate with the configured broker system 2000 to select a multipart identifier type from the selected multipart identifier federation.

The multipart identifier creation step 3100 enables the first member to coordinate with the configured broker system 2000 to make selections of parts to form a multipart federation identifier conforming to the selected multipart identifier type from step 3080; the coordinating comprising having the broker prompting the first member to select a first part conforming with the configured term records 2111, 2211, 2511; management functions 2110, 2210, 2510; resolver records 2112, 2212, 2512; membership records 2113, 2213, 2513; identifier records 2114, 2214, 2514 and coordinating agreements management functions coordinating records 2710, term coordinating records 2711, resolver coordinating records 2712, membership coordinating records 2713, identifier coordinating records 2714, and activity coordinating records 2715 of the federation broker 2700 of the selected multipart federation. The broker prompts the first member to select a second part and so on, until all, of the parts of the selected multipart format are complete.

The verification step 3140 includes the configured broker 2000 verifying that the selected identifier is unique to ensure that the federation is stable and no conflicts or other issues are created. The verifying further comprises verifying that the configured term records 2111, 2211, 2511; management functions 2110, 2210, 2510; resolver records 2112, 2212, 2512; membership records 2113, 2213, 2513; identifier records 2114, 2214, 2514 and coordinating agreements management functions coordinating records 2710, term coordinating records 2711, resolver coordinating records 2712, membership coordinating records 2713, identifier coordinating records 2714, and activity coordinating records 2715 of the federation broker 2700 are not violated.

The allocation step 3150 enables the first member and the configured broker system 2000 to coordinate allocation of a created multipart federation resource identifier and information about the created multipart federation resource identifier. The allocation comprising coordinating the creation of resolver records 2112, 2212, 2512, and resolver coordinating records 2712 that allow the created multipart identifier to be resolved to the identified one or more resources and to the second selected member by the members of the selected federation using the created multipart identifier of the selected multipart identifier format; and recording activity of the method in activity records 2115, 2215, 2515 and activity coordinating records 2715.

The method may be repeated for distributing the second selected resource in other broker systems 2000.

The identified one or more resources may include pricing information, coordinated with an offer management federation (not shown).

FIG. 4 illustrates a method for discovering networked resources in a computerized broker system. FIG. 4 is a flowchart showing the steps of a method 3000 for distributing networked resources according to the present invention.

The method operates within the broker system 2000 above wherein broker system 2000 includes various devices such as computers, routers, network switches, communication links, communication software, routing software, computing devices, sensors, to enable the method on the system.

Figure 5:
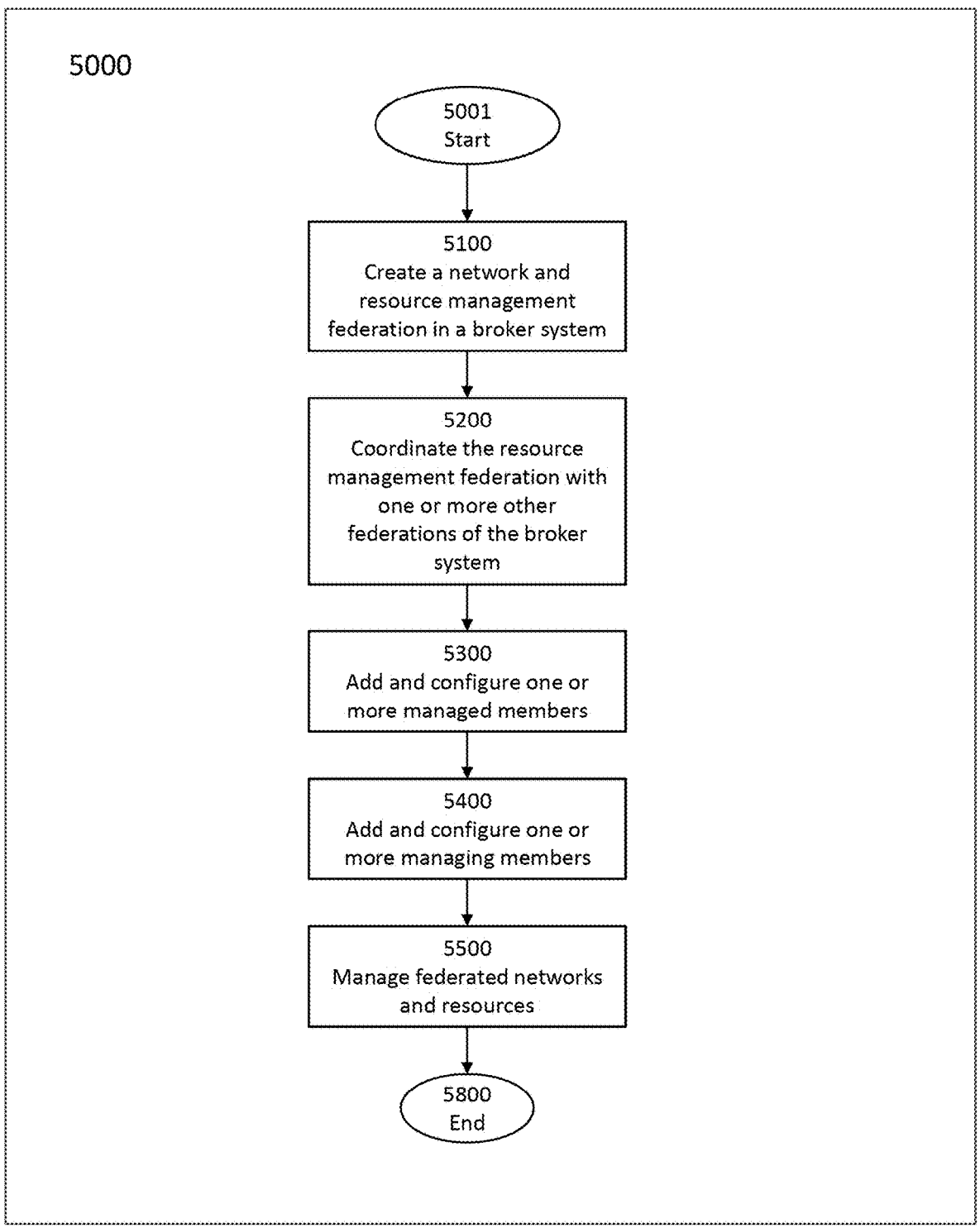
FIG. 5 illustrates a method for managing federated networks and federation resources in a computerized broker system.

The method allows a user to discover resources that are in the distribution channels created by the methods in FIG. 3 by recreating unique identifiers already created in the method of FIG. 5 and by selecting meaningful parts that reflect the needs and interests of the user that match the nature of the resource so identified, During the discovery process the user is presented with additional identifying information to aid in the selection including additional information about complete identifiers that match the user's selection.

In the current invention, the method for discovering networked resources 4000 includes a joining step 4010 where one or more of the independent individuals who share a mutual interest in distributing federated resources joins the distribution federation as a third user and becomes a user 2600 of the configured broker system 2000 a member of the created distribution federation and may become a member of the selected one or more of the plurality of federations.

The third member may also be invited by a fourth member of the distribution federation wherein the fourth member may be, for example, an applications 2620 type of federation users 2600 of the broker system 2000.

The method 3000 continues with a first selection step 4050 wherein the third user coordinates with the broker system 2000 to select a first part wherein the first part may be relevant to the third user and may likewise be relevant to others of the independent individuals who share a mutual interest in distributing federated resources and the broker does not wish to limit the choices of first parts.

The method further includes a first search step 4060 wherein the broker system 2000 coordinates with the third user to search the distribution federation and other federations if desired for normalized instances of the first selected part. If no instances exist, the third user is prompted to repeat the first selection step 4050. If a normalized instance exists the broker system retrieves the identifiers, parts that are structures and parts that are substructures which contain the first selected part. The broker system 2000 resolves other information about the results that may be useful for presentation to the third user, including other information describing a plurality of federations 2100, 2200, off-network federations 2500 and delegated federations 2116, 2117, 2216 that provided results. The results may be drawn from the resolver 2111, 2211, 2511; management functions 2110, 2210, 2510; resolver records 2112, 2212, 2512; membership records 2113, 2213, 2513; identifier records 2114, 2214, 2514 activity records 2115, 2215, 2515, activity coordinating records 2715 management functions coordinating records 2710, term coordinating records 2711, resolver coordinating records 2712, membership coordinating records 2713, identifier coordinating records 2714, and activity coordinating records 2715 of the federation broker 2700. The search results returned from the federations that the third user has joined and information that the third user may use to make a decision to join the plurality of federations 2100, 2200, off-network federations 2500 and delegated federations 2116, 2117, 2216 that provided results are presented to the third user for selection. The accumulated data in the resolver records 2111, 2211, 2511; management functions 2110, 2210, 2510; resolver records 2112, 2212, 2512; membership records 2113, 2213, 2513; identifier records 2114, 2214, 2514 activity records 2115, 2215, 2515, activity coordinating records 2715 management functions coordinating records 2710, teen coordinating records 2711, resolver coordinating records 2712, membership coordinating records 2713, identifier coordinating records 2714, and activity coordinating records 2715 of the federation broker 2700 allow the presentation of a great deal of information to support the third user's informed selection. For example activity data presented with a selection can inform the user of the popularity of the result. The method further, includes a join decision 4080 wherein the third user selects whether or not to join the plurality of federations 2100, 2200, off-network federations 2500 and delegated federations 2116, 2117, 2216 that provided results The method further includes a results presentation step 4100 wherein the search results returned from the federations that the third user has joined and information that the third user may use to make selection decisions are presented to the third user for selection wherein the results are from decision step 4080 or additional results step 4220.

The method further includes a second selection step 4110 comprising the third user selecting one or more results from the returned search results of step 4100

The method further includes a satisfaction step 4200 wherein the third user chooses if they are satisfied with the current results. If the user chooses yes, they proceed to step 4270 of the current method. If not, they choose further parts.

The method further includes a step 4220 where the third user makes additional selections of parts from the results presented in step 4100 and the broker conducts a search using the additional selections of parts and returns the third user to step 4110.

The method further includes a step 4270 enabling the third user to select desired identifiers, add required information to incomplete parts of incomplete identifiers to form completed identifiers, and use the completed identifiers to discover, connect and correspond with independent federation resources.

The method further includes a step 4280 wherein the broker system 2000 records activity of the method in activity records 2115, 2215, 2515 and activity coordinating records 2715.

FIG. 5 illustrates a method 5000 for managing federated networks and federation resources in a computerized broker system. FIG. 5 is, a flowchart showing the steps of a method 5000 for managing federated networks and resources, according to the present invention.

The method operates within the broker system 2000 above wherein broker system 2000 includes various software and devices such as computers, routers, network switches, communication links, communication software, routing software, computing devices, sensors, security applications, network management software, to enable the method on the system.

Managing federated networks and resources helps to ensure that the federated networks and resources are secure, available, stable, efficient, appropriately used and other benefits. Managing federated networks and resources includes, for example, monitoring, testing, analysis, operating, protecting, planning, repairing, configuring, forensic investigation and other management activities. Managing federated networks and resources may also include identifying poor performance, inappropriate use, unauthorized access, disruptions, modifications, attack, and other indications that need the attention of managers.

As federation users 2600 configure the broker system 2000 for brokering a great deal of descriptive information is organized and coordinated about the plurality of federations 2100, 2200, off-network federations 2500 and delegated federations 2116, 2117, 2216, the federation users 2600, the federated communication networks 2400 and the federation broker 2700. As changes are made to the plurality of federations 2100, 2200, off-network federations 2500, and delegated federations 2116, 2117, 2216, the federation users 2600, the federated communication networks 2400 and the federation broker 2700, the coordinated descriptive information may be updated and maintained. As federation users 2600 perform the steps of distributing networked resources described in FIG. 3, they are creating meaningful, coordinated resource identifiers for federation users 2600 and resolver records with information about the identified federation users 2600 that provide coordinated descriptive information. As federation users 2600 perform the steps of discovering networked resources described in FIG. 4 the resolver records, resource identifiers and parts they select demonstrate interest in the identified resource and parts and may indicate intent. The broker system 2000 records brokerage activities in activity records 2115, 2215, 2515 and activity coordinating records 2715. Thus, the broker system 2000 contains a great deal of well-organized descriptive information about a plurality of federations 2100, 2200, off-network federations 2500 and delegated federations 2116, 2117, 2216, the federation users 2600, the federated communication networks 2400 and the federation broker 2700.

In one embodiment of the invention, the steps of distributing networked resources described in FIG. 3 may be intentionally performed to create coordinated resource identifiers for federation users 2600 that are intentionally arbitrary and complex, or good for one use, by one user or expire rapidly, and resolver records with information about the identified federation users 2600 may be deceptive. These features of the current embodiment may be useful for protecting resources.

The coordinated descriptive information about a plurality of federations 2100, 2200, off-network federations 2500 and delegated federations 2116, 2117, 2216, the federation users 2600, the federated communication networks 2400, and the federation broker 2700 and the selections demonstrating interest and intent of federation users 2600 and the brokerage activity are stored in the broker system 2000 in the term records 2111, 2211, 2511; the management functions 2110, 2210, 2510; resolver records 2112, 2212, 2512; membership records 2113, 2213, 2513; identifier records 2114, 2214, 2514; and activity records 2115, 2215, 2515, the management function coordinating records 2710, term coordinating records 2711, resolver coordinating records 2712, membership coordinating records 2713, identifier coordinating records 2714, and activity coordinating records 2715, are well organized and available for search and retrieval for managing federated networks and resources.

The coordinated descriptive information, selections demonstrating interest and intent and the brokerage activity stored in the broker system 2000 may be very useful for managing networks and resources.

The federation users 2600 include one or more of information resolvers 2610. applications 2620, people 2630, resources 2640 and devices 2650. The federation users 2600 may require monitoring, testing, analysis, operating, protecting, planning, repairing, configuring, forensic investigation and other management activities. The federation users 2600 may be performing poorly or exposed to inappropriate use, unauthorized access, disruptions, modifications, attack, and other issues that need the attention of managers. The one or more of the federations 2100, 2200, off-network federations 2500 and delegated federations 2116, 2117, 2216, the federation users 2600, and the federation broker 2700 may actively be involved in operating and managing the federated communication networks 2400 and federation users 2600 on them which may further comprise federated resources 2640. The federation users 2600 may act as federated network and resource managers or be managed by federated network resource managers or have both roles. The coordinated descriptive information, the selections demonstrating interest and intent of federation users 2600 and the brokerage activity of the current invention may enable the federation users 2600 that are managing members to manage better by providing new types of information, and enabling discovery using the methods of FIGS. 3 and 4 of information that may otherwise be undiscoverable by other means or require a great deal of network traffic and computing to discover. The coordinated descriptive information, the selections demonstrating interest and intent of federation users 2600 and the brokerage activity of the current invention may enable the federation users 2600 that are managed members to reveal information, including by distribution using the methods of FIGS. 3 and 4, to managers that will improve their ability to manage federated networks and resources. The current invention, provides new types of information and enables information that otherwise may be undiscoverable by other means or require a great deal of network traffic and computing to discover.

In the present invention, the method 5000 includes a creating step 5100 wherein the creating step 5100 includes configuring a broker system 2000 with a network and resource management federation with the features and functions consistent with federations 2100, 2200 of FIG. 2. The create step 5100 further includes configuring the network and resource management federation for managing members and managed members by creating one or more of the term records 2111, 2211, 2511; the management functions 2110, 2210, 2510; the resolver records 2112, 2212, 2512; the membership records 2113, 2213, 2513; the identifier records 2114, 2214, 2514; and the activity records 2115, 2215, 2515 that reflect the terms, management functions, resolver records, membership records identifier records and activity records useful for a federation of network and resource managers.

The method 5000 further includes a coordination step 5200 wherein the configured term records 2111, 2211, 2511; the management functions 2110, 2210, 2510; the resolver records 2112, 2212, 2512; the membership records 2113, 2213, 2513; the identifier records 2114, 2214, 2514 of the network and the resource management federation are coordinated with term records 2111, 2211, 2511; the management functions 2110, 2210, 2510; the resolver records 2112, 2212, 2512; the membership records 2113, 2213, 2513; the identifier records 2114, 2214, 2514 of one or more other of a plurality of federations 2100, 2200, off-network federations 2500 and delegated federations 2116, 2117, 2216 and the coordinating agreements are stored as management function coordinating records 2710, term coordinating records 2711, resolver coordinating records 2712, membership coordinating records 2713, identifier coordinating records 2714, and activity coordinating records 2715 of the federation broker 2700.

The method 5000 further includes a step 5300 for adding, and configuring a managed member, wherein one or more of the federation users 2600 is assigned as a managed member in the network and resource management federation term records 2111, 2211, 2511; the management functions 2110, 2210, 2510; the resolver records 2112, 2212, 2512; the membership records 2113, 2213, 2513; the identifier records 2114, 2214, 2514 are updated to reflect the assignment and the assignment, is further coordinated with the federation broker 2700 and the coordinating agreements are stored as management function coordinating records 2710, term coordinating records 2711, resolver coordinating records 2712, membership coordinating records 2713, identifier coordinating records 2714, and activity coordinating records 2715 of the federation broker 2700.

The method 5000 further includes a step 5400 for adding and configuring a manager, wherein one or more of the federation users 2600 is assigned as a managing member in the network and resource management federation term records 2111, 2211, 2511; the management functions 2110, 2210, 2510; the resolver records 2112, 2212, 2512; the membership records 2113, 2213, 2513; the identifier records 2114, 2214, 2514 are updated to reflect the assignment and the assignment is further coordinated with the federation broker 2700 and managed members and the coordinating agreements are stored as management function coordinating records 2710, term coordinating records 2711, resolver coordinating records 2712, membership coordinating records 2713, identifier coordinating records 2714, and activity coordinating records 2715 of the federation broker 2700.

The method 5000 includes a managing step 5500, wherein managing resources operate to manage the managed resources to help ensure the federated networks and resources are secure, available, stable, efficient, appropriately used and other benefits. The managing step 5500 further comprises the managing resources and the managed resources generating and using the coordinated descriptive information, the selections demonstrating interest and intent of federation users 2600, and the brokerage activity of the current invention to perform the management step.

The managing step 5500 further comprises monitoring, testing, analysis, operating, protecting, planning, repairing, configuring, forensic investigation and other management activities.

The managing step 5500 further comprises identifying poor performance, inappropriate use, unauthorized access, disruptions, modifications, attack, and other indications that need the attention of managers.

Figure 6:
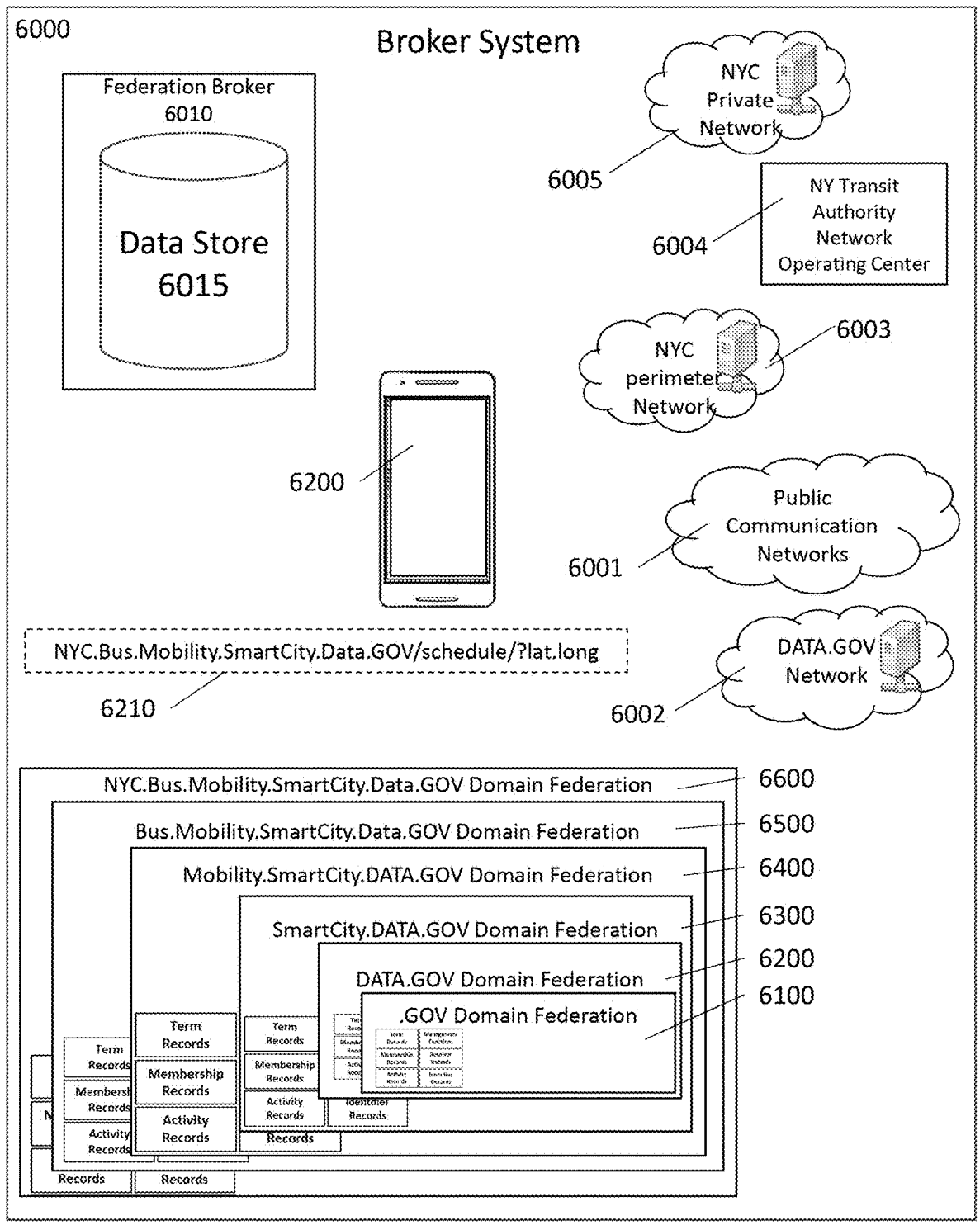
FIG. 6 is a description of the current invention used to allocate hierarchically allocated domains in the DATA.GOV domain and to coordinate the resource name within each domain to coordinate the formation of a full URL.

FIG. 6 illustrates an alternate embodiment of the current invention wherein the federation broker 6000 is configured to coordinate among a plurality of hierarchically delegated domains and a multitude of other federations and federation brokers to manage URLs for government resources in the .GOV domain. The federation broker 6000 comprises a federation broker 6010 which is configured with a data store 6015. In the current embodiment, data of the federation broker 6010 are stored and managed in a data store seen in the description of U.S. Pat. No. 7,386,792, issued on Jun. 10, 2008, hereby incorporated by reference in its entirety and coordinating records created using techniques also described in U.S. Pat. No. 7,386,792

FIG. 6 also illustrates a Hierarchically delegated independent federation of DATA.GOV domain federations 6100, 620, 6300, 6400, and 6500, 6600. The domains are delegated hierarchically with a coordinated logic to allow presentation and selection of layers of the hierarchy for selection during the distribution and discovery methods discussed in FIGS. 5 and 6. The furthest delegated independently managed federation 6600 has been allocated in the smart city domain to the New York port authority. One of the URL protocols that are permitted by the bus federation 6500 is for the formation of requests for local bus availability. In FIG. 6, the phone 6200 is a member of the bus federation 6500 with the NYC.bus federation 6600. The New York city port authority 6004 is a member as is the web service for bus schedules that responds to a coordinated multipart URL 6210. The port authority member 6004 used the methods of FIG. 3 to create the federation 6600 and multipart URL 6210. The phone member used the methods of FIG. 4 to discover the multipart URL 6210 and information about the URL that instructs the phone member 6200 to enter a latitude and longitude of their location before requesting the resource.

The current embodiment is configured to support discovery, connection and correspondence with resources in the United States Government .GOV domain by brokering the allocation, discovery and use of .GOV domain names and URLs to improve citizen service by improving awareness of and access to government data. It, is further configured to support network and resource security and management NYC may wish to distribute their smart city services through other channels.

The coordination provided by the broker, gives the DATA.GOV domain managers confidence that the multipart allocation will be stable and meaningful and useful as described in methods of FIG. 3,4.

The insights provided by the broker, including awareness of the nature of resources on the networks, visibility of traffic through the DNS hierarchy, broad coordination of file locators gives a great deal of information for federated network and resource management.

Today, domain names in the .GOV domain are allocated arbitrarily, first come first served requesting organizations. The currently allocated .GOV domain names reflect the government's federal, state and local organization chart, not the resources within each domain. Even the most common public records such as budgets of the many government organizations are hidden within organizational domains.

The disclosed embodiments are illustrative, not restrictive. While specific configurations of the system and methods of the present invention, have been described, it is understood that the present invention can be applied to a wide variety of networked environments and resources. There are many alternative ways of implementing the invention.

The invention claimed is:

1. A method for distributing federated networked resources by assigning coordinated identifiers suitable for distribution and selection enabled by a computerized broker system, the method comprising:

a. creating a first federation wherein first federation users share a mutual interest in distributing federated networked resources;

b. creating and configuring a distribution federation broker in the computerized broker system, including selecting and coordinating the first federation, one or more multipart identifier federations and one or more other federations, wherein the one or more other federations support creation of a one or more unique multipart identifiers suitable for distribution;

c. further configuring the distribution federation broker by creating term records, membership records, activity records, management functions, resolver records and identifier records for the first federation, one or more multipart identifier federations and one or more other federations d. further configuring the distribution federation broker by creating coordinating records in the distribution federation broker containing one or more coordinating agreements between two or more of the created term records, membership records, activity records, management functions, resolver records and identifier records, wherein the coordinating records are used for agreement and avoidance of conflict;

e. enabling the first federation users to use the first federation, the configured distribution federation broker, and one or more of: the one or more multipart identifier federations and the one or more other federations;

f. allowing a second user to join the first federation, one or more multipart identifier federations and one or more other federations;

g. enabling a first user to select the second user and one or more of the federated network resources for distribution, wherein the selected second user is capable of resolving the selected federated network resources using the coordinating records;

h. allowing the first user to select information about the selected second user;

i. allowing the first user coordinating with the configured federation broker to make selections of parts to create one or more unique multipart identifiers that can be used for distribution of the one or more of the federated network resources;

j. verifying the created one or more unique multipart identifiers is unique;

k. allowing the first user and the configured federation broker to coordinate allocation of the created one or more unique multipart identifiers to the one or more selected-federated network resources and to the second user by creating one or more term records, membership records, activity records, management functions, resolver records and identifier records and coordinating records in one or more of the first federation, one or more multipart identifier federations and one or more other federations.

2. The method of claim 1 further comprising the second user selecting the created one or more unique multipart identifiers for distribution of the one or more of the federated network resources.

3. The method of claim 1 wherein the distribution federation broker is used to manage distribution of network resources.

4. The method of claim 1 further comprising creating a service subscription.

5. The method of claim 1 wherein the federated network resources comprise media, information and services.

6. The method of claim 1 wherein the created one or more unique multipart identifiers comprise metadata.

7. The method of claim 6 wherein the first federation uses metadata for distributing federated networked resources.

8. The method of claim 1 wherein the selected information about the selected second user is used to manage unauthorized access.

9. The method of claim 1 further comprising the second user submitting a request for selection to the first user.

10. The method of claim 1 further comprising allowing the second user coordinating with the configured federation broker to make selections of parts to create one or more multipart identifiers that are used for selecting one or more of the created one or more unique multipart identifiers.

11. A system for coordinating multipart identifiers and resolver outcomes of identified resources, the system comprising:

a. a plurality of federations comprising:
  i. a first federation, the first federation comprising first members, the first members comprise a common interest grouping of one or more of: networked computer systems, network routing and switching systems, networked database applications, networked information server systems, other related networked memory devices and applications;
  ii. a second federation, the second federation comprising second members, the second members comprise a common interest grouping of one or more of networked computer systems, network routing and switching systems, networked database applications, networked information server systems, other related networked memory devices and applications; and
  iii. one or more off-network federations, the one or more off-network federations comprising off-network members, the off-network members comprise a common interest grouping;

b. one or more federation communications networks;

c. one or more computerized federation brokers each including one or more memory devices and wherein one or more of the first members and the second members are users of the computerized federation brokers;

d. wherein the first members and the second members store two or more records of the first federation, the second federation and the one or more off network federations comprising: one or more of
  i. one or more management function records;
  ii. one or more term records;
  iii. one or more resolver records;
  iv. one or more membership records;
  v. one or more identifiers records;
  vi. one or more activity records; and
  vii. information about one or more delegated federations;

e. wherein one or more of the first members and the second members store coordinating agreements comprising one or more of:
  i. management function coordinating records;
  ii. term coordinating records;
  iii. resolver coordinating records;
  iv. membership coordinating records;
  v. identifier coordinating records; and
  vi. activity coordinating records;

f. wherein a multitude of independent interpretations and implementations of management functions, terms, resolvers, members, identifiers and activities of the first federation, the second federation, the one or more off network federations, the first members, the second members and the off-network members are created, discovered, selected, compared and used.

12. The system of claim 11 wherein the one or more federation brokers is configured with the stored two or more records and the stored one or more coordinating agreements and one or more of the first members and the second members use the stored two or more records and the stored one or more coordinating agreements to coordinate use of multipart identifiers and resolver outcomes of identified resources.

13. The system of claim 11 wherein one or more of the first federation or second federation is a multipart identifier federation.

14. The system of claim 11 wherein the first members, the second members and one or more third members use the two or more records and the one or more coordinating agreements for agreement, and avoidance of conflict for identifiers and resolver outcomes.

15. The system of claim 11 wherein the first members, the second members and one or more fourth members use the one or more computerized federation brokers and comprise one or more of:
   a. people;
   b. information resolvers;
   c. applications;
   d. resources;
   e. devices; and
   f. quantum entangled resources.

16. The system of claim 11 wherein one or more of the plurality of federations comprises two or more of: a resource federation, a metadata federation, and a subscription service federation.

17. The system of claim 12 wherein one or more of the first members and the second members create a multipart identifier.

18. The system of claim 17 wherein the created multipart identifier is stored in one or more of:
   i. the plurality of federations;
   ii. the one or more federated resources; and
   iii. the one or more computerized federated brokers.

19. The system of claim 17 wherein the created multipart identifier is assigned to a resource.

20. The system of claim 17 wherein the created multipart identifier is metadata.

* * * * *